United States Patent [19]

Groetschel

[11] 4,222,069
[45] Sep. 9, 1980

[54] METHOD OF AND APPARATUS FOR PRESELECTING OPERATION OF TELEVISION OR RADIO RECEIVING AND RECORDING APPARATUS

[76] Inventor: Karl M. Groetschel, Montsalvatstrasse 1a, D-8000 Munich 19, Fed. Rep. of Germany

[21] Appl. No.: 929,126

[22] Filed: Jul. 28, 1978

[51] Int. Cl.² .................. H04N 5/44; H04B 1/16
[52] U.S. Cl. .................. 358/127; 179/100.1 PS; 179/100.11; 235/375, 455/231
[58] Field of Search .................. 358/127; 179/100.11, 179/100.1 PS; 325/396, 395; 235/454, 487, 375; 200/46

[56] References Cited

U.S. PATENT DOCUMENTS

| | | | |
|---|---|---|---|
| 2,097,901 | 11/1937 | Thomas | 179/100.11 |
| 2,257,537 | 9/1941 | Samburg | 325/396 |
| 2,519,686 | 8/1950 | Miller | 325/395 |
| 2,944,245 | 7/1960 | Lynnworth et al. | 325/396 |
| 3,569,839 | 3/1971 | Dyer | 325/396 |
| 3,681,541 | 8/1972 | Dozier et al. | 179/100.11 |
| 3,747,321 | 7/1973 | Yudewitz | 58/23 C |
| 3,858,222 | 12/1974 | Kleimeyer | 346/17 |
| 3,904,110 | 9/1975 | Bottles | 235/454 |
| 3,936,752 | 2/1976 | Sasabe et al. | 325/396 |
| 4,081,754 | 3/1978 | Jackson | 325/396 |
| 4,084,140 | 4/1978 | Cauldwell | 325/396 |

FOREIGN PATENT DOCUMENTS

| | | |
|---|---|---|
| 664006 | 1/1952 | United Kingdom . |
| 664503 | 1/1952 | United Kingdom . |
| 832476 | 4/1957 | United Kingdom . |
| 1076836 | 7/1967 | United Kingdom . |
| 891895 | 3/1962 | United Kingdom . |
| 1183337 | 4/1970 | United Kingdom . |
| 1255285 | 12/1971 | United Kingdom . |

Primary Examiner—Daryl W. Cook
Assistant Examiner—Donald McElheny, Jr
Attorney, Agent, or Firm—Spencer & Kaye

[57] ABSTRACT

A method of controlling the operation of a recording apparatus for recording video and/or audio signals received in a television and/or radio receiver wherein a data carrier having one or more command tracks associated with a time track and preferably one or more information tracks, is marked by the user in the command tracks to identify programmes to be recorded, and the data carrier is scanned along the or each command track in conformity with elapse of time during the day to generate signals for switching on the receiver and selecting the appropriate receiver channel. The invention also includes provision of a data carrier having said tracks. The invention also includes an apparatus comprising scanning means having sensors for sensor user markings in respective command tracks, and switch circuit means responsive to sensor output to switch on the receiver and select appropriate channels.

17 Claims, 7 Drawing Figures

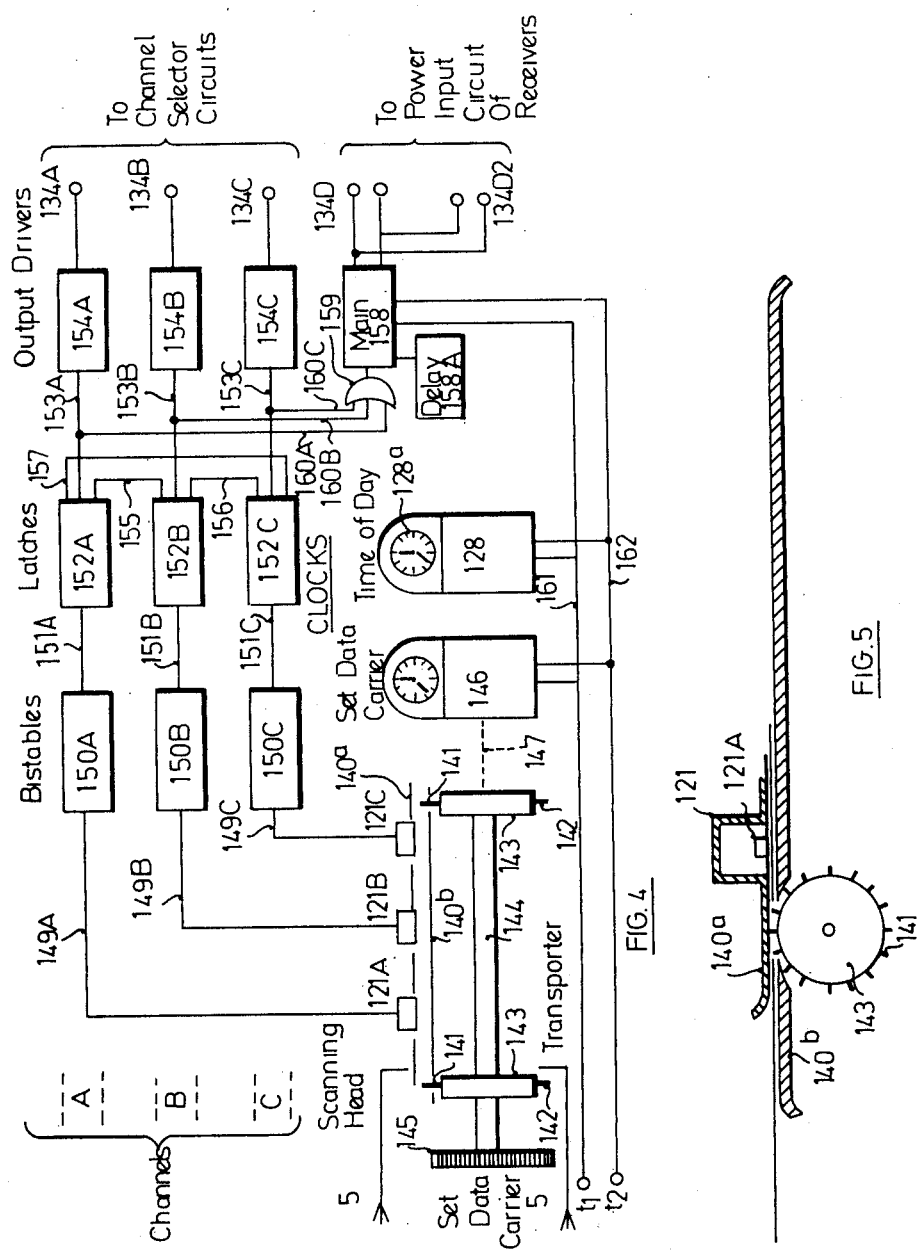

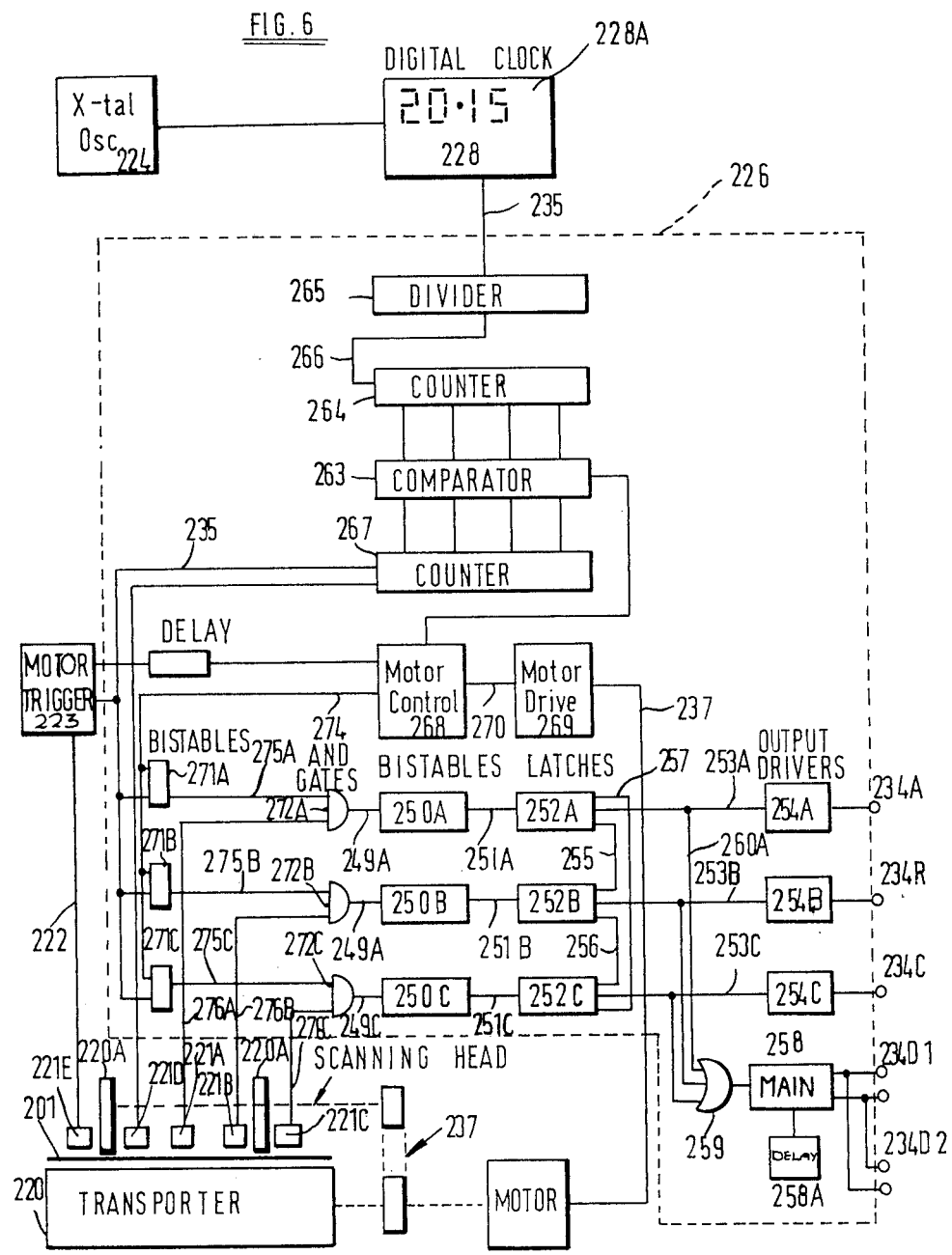

METHOD OF AND APPARATUS FOR PRESELECTING OPERATION OF TELEVISION OR RADIO RECEIVING AND RECORDING APPARATUS

BACKGROUND OF THE INVENTION

1. Field of the Invention

The use of magnetic recording equipment in combination with radio and television receiver sets has become increasingly popular in recent years for selective reproduction at any desired time of particularly interesting programmes. In the case of video recorders the primary incentive for the buyer of such comparatively high priced equipment is the wish to record programmes which he may be unable to see or hear at the time of their actual transmission. Since it also happens very often that no one is available to switch the recording equipment and associated receiver set "on" and "off" at the time in question, it is common practice to use time-switch means which automatically switches the recording equipment and the receiver "on" and "off" at the preselected programme transmission times. The currently most commonly used time switch means for this purpose is the so-called time-switch clock, which, when appropriately set up, e.g. by means of plug and socket contacts, make and break a feed circuit at preselected points in time. However, time-switch means of this type is comparatively complicated to operate, can be pre-set for periods of up to 12 hours only, and will work only for one pre-selected transmission channel, in the sense that the associated receiver can be left pre-tuned to only one channel.

By contrast, it is the aim of the present invention to replace these conventional time switch means with a system which is simple and convenient to operate by the user, allows longer pre-setting periods than a conventional time-switch clock, and offers the additional facility of sequential selection over its period of operation from different transmission channels.

SUMMARY OF THE INVENTION

According to one aspect the present invention resides in a method of controlling the operation of a recorder of electrical video and/or audio signals produced in a television and/or radio recorder, said method comprising:

a. providing a data carrier having
  i. at least one information track marked with data identifying a sequence of programmes to be transmitted over a channel pertaining to that track,
  ii. at least one command track associated with the information track for receiving a users marking appropriately positioned to select one or more of the programmes or part thereof,
b. marking said command track or tracks as required,
c. scanning the command track or tracks in a direction corresponding to the sequence of programme data and by means sensing the marking or markings and in synchronism with the elapse of time over the interval when the sequence of programmes is transmitted to generate control signals for establishing operation of the television and/or radio receiver and associated recorder.

Preferably, the data carrier has a plurality of said information tracks, the data carrier has a plurality of command tracks each associated with a respective one of the information tracks, and channel selection is effected by marking the command tracks selectively.

Preferably also, the data carrier is provided with at least one time track having a sequence of index means along said time track representing the elapse of time and positionally correlated with said programme data in accordance with the transmission times of said programmes, said index means are used to establish conformity between the speed of scanning in said direction with the elapse of time during the day.

Alternatively the method of the invention may be carried out using a data carrier which includes at least one time track and at least one command track. The command track may be marked by the user referring to a separately printed sheet bearing programme details and transmission times, or the carrier may have means defining one or more information tracks as aforesaid but which are detachably united with the remainder of the carrier, and are detailed before scanning is effected.

According to a further aspect the invention resides in provision of a data carrier comprising a sheet having:

a. means defining at least one information track marked with data identifying a sequence of television and/or radio programmes to be transmitted over a channel pertaining to that track,
b. means defining at least one command track associated with the information track for receiving a users marking appropriately positioned to select one or more of the programmes or part thereof,
c. scanning speed control means to enable the sheet to be scanned by means for sensing the marking or markings in a direction corresponding to the sequence of programme data and in synchronism with the elapse of time over the interval when the sequence of programmes is transmitted.

The scanning speed control means may comprise a time track having a sequence of index means along said time track representing the elapse of time. Preferably the index means comprises visible marks on the data carrier collectively defining a time scale.

In a preferred form a plurality of said information tracks are provided on the data carrier, and a plurality of said command tracks are provided on the data carrier each associated with a respective one of said information tracks. Thus, in one arrangement each command track extends parallel to and lies adjacent to its associated information track.

Data carrier sheets are already in use for feeding information to accounting machines (German patent specification OS 2 151 125). These existing data carriers can be inscribed in relatively adjacent data channels or columns by application of a simple code and are subsequently read and evaluated in a data processing device provided with a reading or scanning head (German patent specification 2 155 328).

The use of a data carrier according to the present invention, instead of an adjustable time switch clock with mechanical contacts, greatly improves the ease of operating the recorder and receiver or receivers whilst also providing expanded time and channel selection facilities. A data carrier in accordance with this invention may be distributed or sold, for example, as part of a broadcasting programme sheet or newspaper. The transmission in each channel would be printed in vertical programme sequence in a respective information track, or column, whilst the parallel time track, or column would receive the associated transmission time entries and the length of the time track with associated information track would be selected to be proportional with transmission time for a given programme. The user of such a printed data carrier sheet would have to do no more than tick, underline, or side line in the parallel command column, which may also be combined with the time track, at least the start and end of the programme(s) to be recorded in a form which can be picked up by the sensor of a scanning head of the apparatus hereinafter described. For example, a readable marking of this kind for sensing by a head having one or more photoelectric sensors is a simple pencil stroke or tick at the starting and stopping times of the programme in question. For a magnetic scanning head suitable magnetic paste pens, or the like, would be used to mark the "on" and "off" times on the data-carrier sheet.

In principle, the effect which is aimed at by the present invention is the correctly timed starting and stopping of the recording apparatus and of at least one associated receiver set to receive the appropriate channel, triggered off by manually inscribed commands. This may also be obtained by using a data carrier sheet without a separate information track, that is to say a sheet which is provided only with time and command tracks. The information track on which the manual entries will depend is, or will be, detached from the data carrier sheet before this is introduced into the scanning head. For preference a data carrier of this type which comprises only the tracks which are significant for the functioning of the scanning head is detachably connected with at least one information track containing details of the programmes. The connection may be by tear-off means, e.g. perforated lines, unilateral attachment, e.g. at the top of the sheet, or suitable adhesive connection. However, the provision of one or more information tracks on the data carrier offers the advantages of giving a comprehensive display permitting visual checking at all times.

Moreover, parallel with the track associated with one programme channel, programmes transmitted over a second, third or more channels may be printed on the same data carrier. The time column or track may be the same for all channels. Given a suitable clock means for time synchronisation between the data carrier's progression relative to scanning means, a single data carrier can be used to determine selection of programmes and channels for as long as several days ahead.

From a further aspect there is provided in accordance with the invention a control apparatus for controlling the time of operation of a recorder of electrical video and/or audio signals produced in an associated television and/or radio receiver, said control apparatus comprising:
a. scanning means for receiving a data carrier having at least one command track for bearing a user marking representing the transmission time of any of, or any part of, a sequence of television and/or radio programmes, said scanning means being responsive to a user marking made in such track to generate a control signal,
b. means for causing said scanning means to scan said command track at a speed representing elapse of time during the day,
c. switch circuit means operatively connected with the scanning means and responsive to the control signal to establish a circuit for bringing the recorder and associated television and/or radio receiver into operation.

Preferably the apparatus includes clock means for providing an output representing the time of day, and synchronising means for establishing said data carrier and said scanning means in relative positions at the beginning of a period of use of the apparatus in accordance with said output of said clock means. Said clock means may include means for displaying the time of day, and said synchronising means may comprise means for manually adjusting the position of said data carrier relatively to said scanning means at the beginning of a period of use.

In a more sophisticated form of the apparatus said scanning means comprises sensing means including respective sensors for sensing said user marking in said command track and time index means in a time track defining elapse of time during the day, support means for said data carrier, motor means for effecting relative movement longitudinally of said tracks between said support means and said sensing means to generate a series of time track signals from the beginning of said time track, and said switch circuit means includes a first counting means for counting elapse of time during the day, a second counting means for counting said time track signals, comparator means connected to compare output from said first and second counting means and connected to said motor means to start said motor means when said first counting means provides an output showing greater time elapse than is represented by the output of said second counting means; and to stop said motor when said outputs represent the same elapse of time.

In either case it is preferred that said scanning means shall comprise sensing means including respective sensors for sensing user markings in respective ones of a plurality of said command tracks, and said switch circuit means includes a plurality of switching channels responsive to the outputs of respective ones of said sensors to establish a respective channel of an associated receiver in operation, latch means for holding that one of said channels which first responds for the period represented by said user marking in the associated command track for the period of said marking.

BRIEF DESCRIPTION OF THE DRAWINGS

The invention will be hereinafter more specifically described with reference to the accompanying drawings wherein:

FIG. 4 shows a further embodiment of the apparatus for which the data carrier of FIG. 3 is suitable;

FIG. 5 is a fragmentary view of the scanning means in section on the line 5—5 of FIG. 4;

FIG. 6 shows a further embodiment of the apparatus for which the data carrier of FIG. 1 is also suitable;

DESCRIPTION OF THE PREFERRED EMBODIMENT

Figure 1:
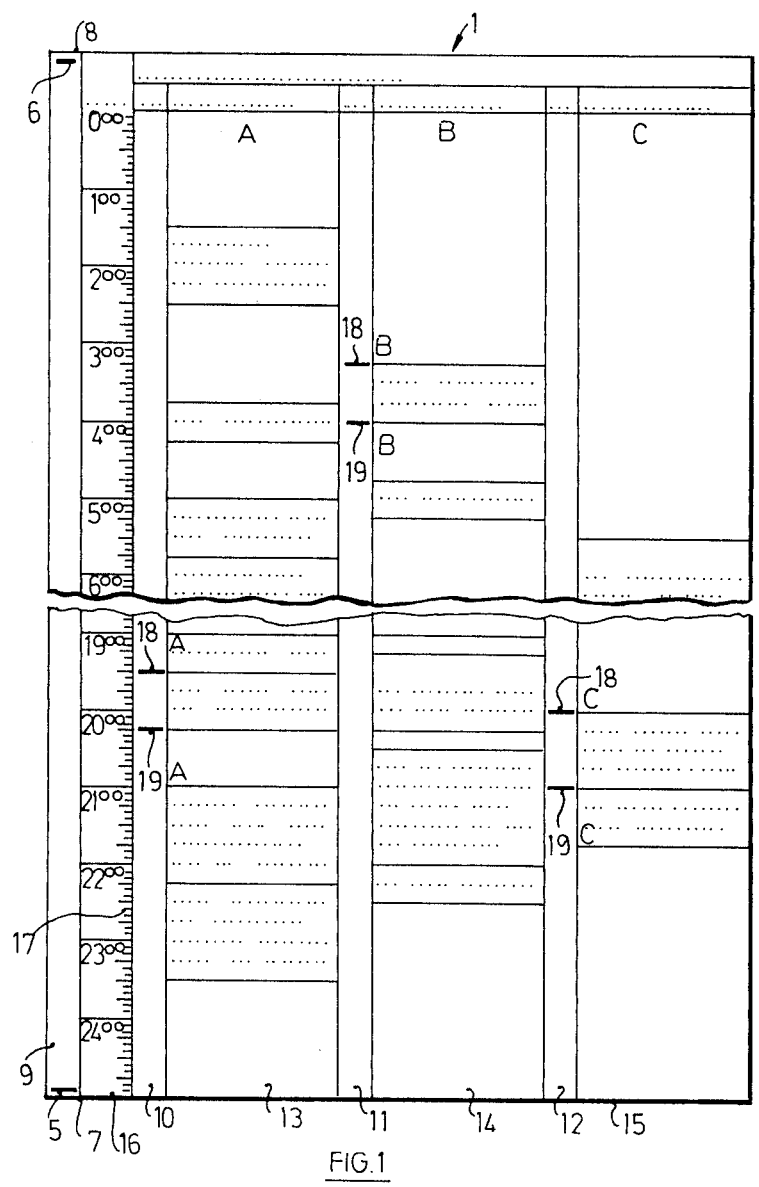
FIG. 1 shows a plan view of one form of data carrier in accordance with the invention for carrying out the method thereof.
Figure 2:
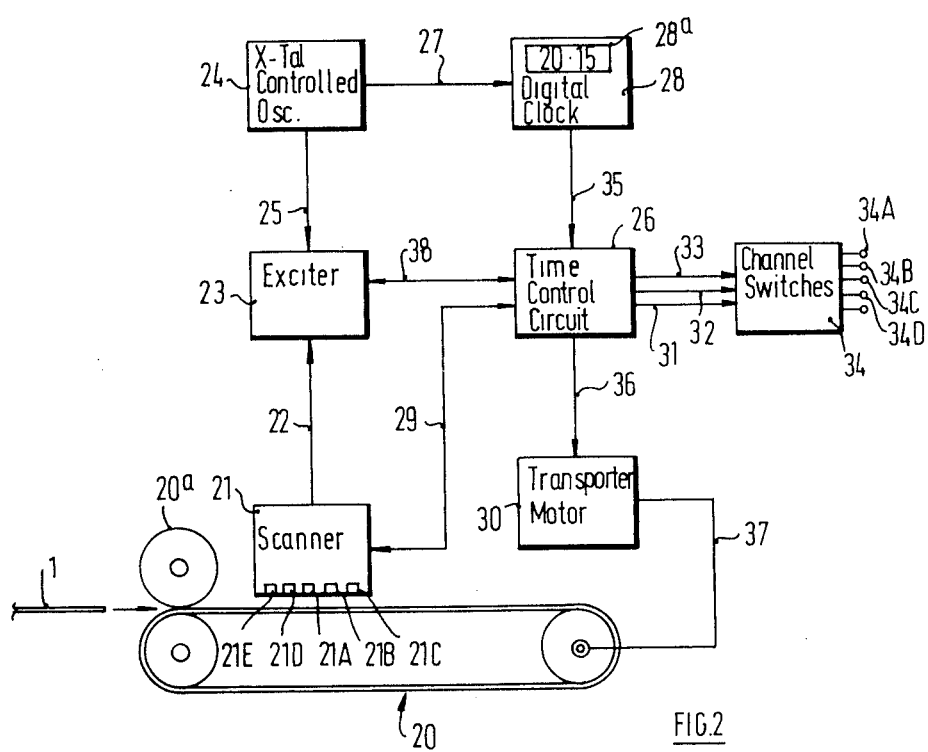
FIG. 2 shows one embodiment of apparatus in accordance with the invention for which the data carrier of FIG. 1 is suitable.

Reference is made firstly to the data carrier shown in FIG. 1 and the apparatus shown in FIG. 2. FIG. 1 is a schematic plan view of a data carrier sheet or strip which may be used for starting and stopping a video recorder as well as for channel or programme selection from an associated television receiver over a period of 24 hours. The data carrier 1 comprises, in laterally adjacent parallel disposition, a number of tracks or columns (herein referred to as tracks) including start/stop track 9, a timing track 16, a first command track 10, a first information track 13, a second command track 11, a second information track 14, a third command track 12, and a third information track 15. In the information tracks 13, 14 and 15, the respective programmes to be transmitted are printed or inscribed in directly readable form in precise coordination with the relevant times which are printed or inscribed in boxes, or areas, which are respectively opposite to the times at which the programmes are transmitted with reference to the time track 16. As shown the time track 16 has graduation marks 17 transverse to the length of the track and collectively forming a time scale.

The successive programmes listed on the data sheet for the whole time period corresponding to the time track 16 can be checked at any time desired and the user can mark, for example by ticks or by side lining or horizontal lines as shown in the command columns 10, 11, 12, those programmes which he wishes to be recorded by the video tape recorder, the marking identifying the starting times 18A, 18B, 18C and the finishing times 19A, 19B, 19C respectively of the selected programmes. The device illustrated in FIG. 2 is associated with a recorder and scans the command columns 10, 11 and 12 concurrently in timed or synchronised relation with the actual transmission times of the programmes and generates "on" or "off" command signals in accordance with the command markings such as 18A and 19A respectively. Programme selection is effected in accordance with the particular command track 10, 11 or 12 in which marking is made and which results in generation of a respective command signal. For convenient reference the three transmission channels are designated A, B, C and these references are marked on appropriate tracks on the drawing.

The data carrier 1 which in the illustrated embodiment of the invention is laid out for a 24 hour day may be adapted for longer periods, e.g. a whole week, by a corresponding extension of its length in the direction of the tracks. Furthermore, a larger number of information tracks containing programmes of respective transmission channels may be accommodated on the data sheet if desired.

The data carrier may, and preferably has, a further stop/start track 9, the leading and trailing edges 8, 7 or marks 6, 5 of which are used to start/stop the apparatus hereinafter described.

Referring to FIG. 2, this shows a control apparatus for bringing an associated recording apparatus and a television and/or radio receiver into and out of operation at pre-selected times, and on pre-selected channels. The apparatus comprises a transporter means here shown as an endless belt 20 and cooperating in-feed roller 20a. The transporter means may, alternatively, be a device of the kind described in the above mentioned German patent specification No. 2 155 328 with a pair of cooperating endless transport strips or belts.

The data carrier 1 is inserted by its leading edge 8 into the transporter means. The row of graduation marks 17 provided on the data carrier, e.g. an appropriate scale on the time track 16, provide for positive carrier drive.

The time scale graduation marks 17 are preferably in the form of thin lines or strokes which can be scanned by a reading or scanning means of the control apparatus, firstly to provide signals for advancing the data carrier relative to the scanning means to a position corresponding to the time of day at which it is inserted, and thereafter for advancing it at a speed correlated with the passage of time during the day.

The apparatus includes a scanning head 21 which in combination with the transporter means forms a scanning means. The scanning head 21 is provided with sensing means comprising a row of sensors extending at right angles to the direction of travel of the upper run of the belt 20. The sensors may be photo-sensitive elements such as photo-transistors. In FIG. 2 the sensors 21E and 21D, 21A, 21B, 21C, respectively are positioned for sensing only the leading and trailing edges 8, 7 of the sheet or marks adjacent thereto 6, 5; and tracks 16, 10, 11, and 12, are shown diagrammatically as being spaced apart parallel to the direction of travel of the carrier, but it will be understood that in practice they lie in a row which is at right angles to this direction. As soon as the data carrier 1 comes into register with the sensors a trigger signal is generated by sensor 21A in the scanning means 21 and fed to an exciter or driver 23. This exciter or driver 23 receives a constant frequency input signal from a crystal-controlled generator 24 via line 25 and uses this signal to activate a time control circuit 26.

The constant frequency generator 24 is also connected via line 27 to a digital clock 28, which preferably has a display 28a showing the time of day, and in which stepping signals representing seconds, minutes, and hours, are generated, e.g. by means of suitable frequency divider circuits of the clock fed from generator 24.

After activation of the exciter or driver circuit 23 the time control circuit 26 provides a check or repeat signal which is fed to the scanning head 21 via line 29 and effectively de-activates the sensors which respond to inscriptions in the command columns by blocking their signals to the exciter or driver circuit 23. At the same time the time control circuit 26 starts a drive motor 30 via line 36 connected mechanically as indicated at 37 to a drive roller or sprocket of the transporter belt 20. The belt is started or actuated and the data carrier 1 is rapidly advanced by a drive signal derived from generator 24 via line 25 to exciter 23 and line 38 to time control circuit 26. This continues until the sensors of the scanning head 21 which scan the time track 16 and command tracks 10, 11, 12 are lined up with the time marks 17 on the data carrier which corresponds to the time of day measured by the digital clock 28 and transmitted to the time control device 26 via line 35. This position of the data carrier relatively to the scanning head 21 is determined by means of binary counters and a comparator in the time control device 26. The correct position is established for the data carrier as soon as a counter driven by the exciter 23 receiving input signals from the sensor counting graduation marks 17 in time track 14 has counted up to the same value as another counter driven by the digital clock 28, the signals in each case representing the same intervals of time.

When this position has been established the fast transporter drive is switched off in the time control circuit 26 whereupon the time control circuit 26 controls drive 30 proportionally with the digital clock signals. At the same time the repeat or check signal in line 29 which blocked the sensor signals is interrupted, and a blocking signal is fed by the time control circuit 26 to the exciter 23 via line 38 which interrupts the up to then continuous driving signal input.

At this stage the data carrier 1 is transported further in synchronism with the elapse of time during the day and constantly scanned for command marks. Whenever a command mark 18A, 18B or 18C is sensed in one of the three command tracks 10, 11, 12, the exciter 23 is re-activated and issues a command signal to the time control circuit 26 which in turn feeds a starter signal to one of the three lines 31, 32, or 33. The particular one of these three lines 31, 32, 33 which will receive the signal depends on the particular command track 10, 11, 12 which contains a command inscription thereby causing an associated one of the sensors 21A, 21B, 21C to provide a signal to the exciter and time control circuit. By means of these conductor lines 31, 32, 33 switch means 34 associated with the recording apparatus and the receiver set is actuated.

The switch means 34 includes separate switching channels leading to output terminals 34A, 34B, 34C for connection to the channel switch circuits of the television receiver and has switch terminals 34D for switching the receiver as a whole "on" and "off".

The second command mark 19A, 19B or 19C triggers the "off" command whereupon the data carrier 1 continues its time-synchronised advancement through the otherwise non-activated device until either a new "on" mark is scanned or the sensor 21E of the scanning head 21 senses the trailing edge 7 or mark 5 of the data carrier 1. In the latter event data carrier transport will continue up to a suitable discharge point whereupon the motor 30 for the transport means 20 is switched off.

Figure 3:
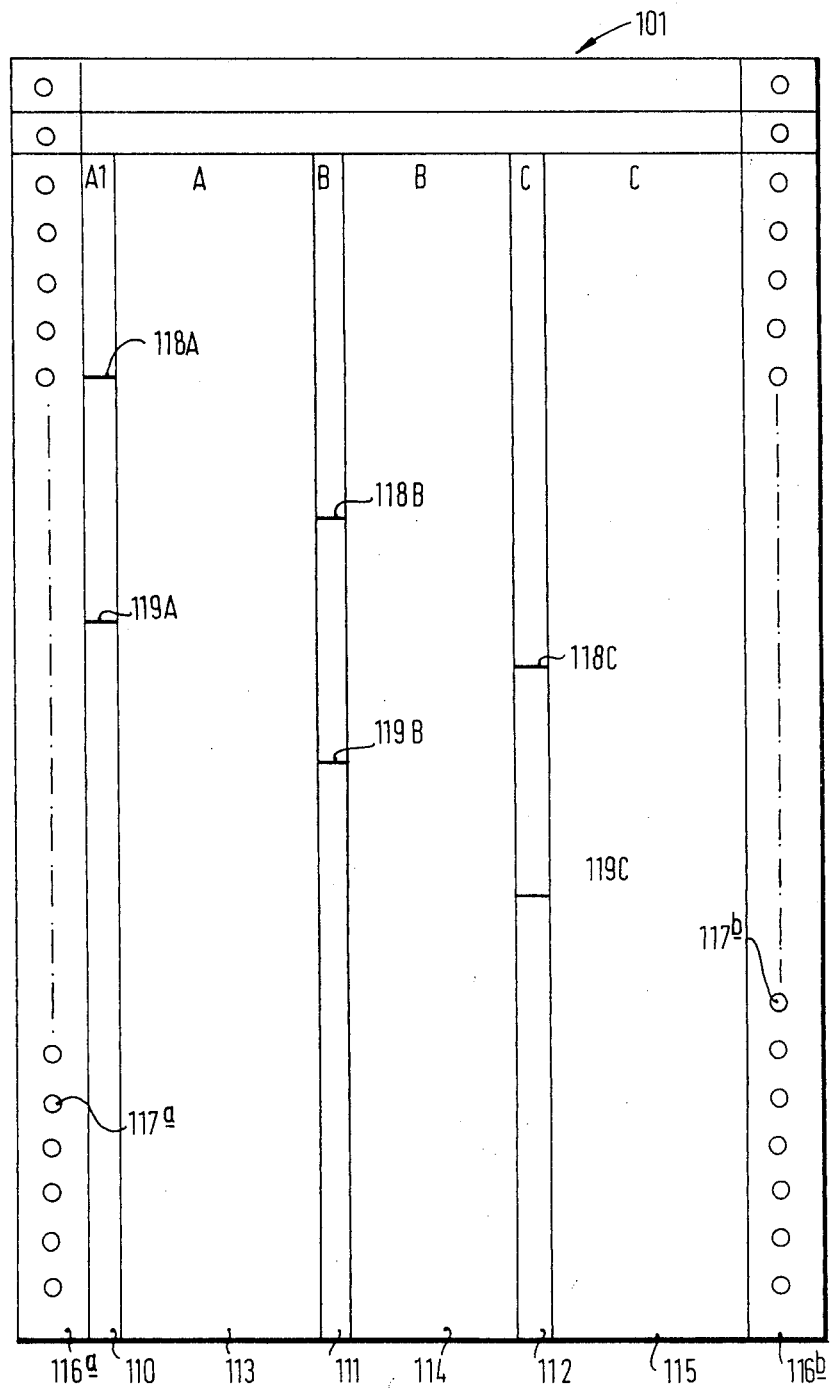
FIG. 3 shows a plan view similar to FIG. 1 of a further form of data carrier.

Referring now to FIGS. 3, 4 and 5, these illustrate a simplified form of data carrier and apparatus. Parts which are equivalent to those previously described are denoted by like references with the prefix 100. The latter includes a scanning means constituted by the combination of a transporter means 120 and a scanning head 121 having photo-electric sensors 121A, 121B, 121C for scanning respective command tracks of the data carrier 101.

The transporter means 120 comprises upper and lower guide plates 140a, 140b, the latter having apertures 141 in its lateral margins through which extend the teeth or pins 142 of a pair of drive wheels 143. The wheels 143 are fixed on a shaft 144 on which is also fixed an adjusting knob 145 to enable the shaft to be rotated manually. The shaft is driven from a synchronous motor incorporated in "set data carrier" clock 146. The latter is connected mechanically to the shaft 144 by a coupling 147, shown diagrammatically in dashed lines, and includes a display means such as an analogue dial and hands 146a, or a digital display unit if desired.

The apparatus further comprises a "time of day" synchronous motor clock 128 having a display means 128a similar to that of clock 146 and is preferably mounted adjacent to the latter.

Both clock motors are of the self-starting type and are powered from a suitable A.C. source having a frequency of 50 Hz or 60 Hz applied at terminals t1, t2.

The photo sensors are connected to form inputs to respective electrical channels pertaining to transmitting channels A, B, C for which programme data would be printed in information tracks 113, 114, 115. These electrical channels comprise conductors 149A, 149B, 149C, bistable circuits 150A, 150B, 150C, conductors 151A, 151B, 151C, latch circuits 152A, 152B, 152C, conductors 153A, 153B, 153C and output driver circuits 154A, 154B, 154C.

The driver circuits have respective output terminals 134A, 134B, 134C. The output terminals would in use be connected, as before, to channel switching circuits of the receiver. A channel switching circuit may be switched off when its associated terminal such as 134A is low ("0") and switched on when such terminal is high ("1"). If the channels are normally switched by push-button operated switches on the receiver, the connections to the channel switching circuits would be at points therein such as to override any prior selection by the push-buttons, or the user may be instructed to ensure that all push-buttons are in unoperated positions. In other cases the receiver channel switches may be of the "touch" or proximity type and the signal "1" or "0" supplied from the appropriate terminal may then correspond to a finger "touch" and absence of the finger respectively.

The latch circuits 152A, 152B, 152C have interconnections via conductors 155, 156, 157 which hold open the electrical channel which first receives an input from its associated sensor and closes the remaining channels to any signals provided by their sensors should the user inadvertently have marked the command tracks 110, 111, 112 with time-overlapping marks.

The bistable circuits 150A, 150B, 150C may be of a form to be switched from one stable state to the other in response to sensing of marks such as 118A, 118B, 118C and back to the first state in response to sensing of marks such as 119A, 119B, 119C, or if the marking is intended to be in the form of a side line the bistable circuits may be switched from the first to the second state by the sensing of the (dark) side line and revert to the first state when the line ceases, i.e. the command track is unmarked (light).

To effect switching-on and switching-off of the associated receiver or receivers, a main switching circuit 158 is connected through an OR gate circuit 159 and conductors 160A, 160B, 160C to the electrical channels. Preferably it is provided with a plurality of pairs of output terminals $134D_1$, $134D_2$ which become "live" at the mains voltage when a channel is selected. The clocks and main switch circuit are connected to the mains supply terminals by conductors 161, 162.

The main switch circuit preferably incorporates a delay circuit 158a to delay switch-off for a short period of typically 1 to 5 seconds.

The function of the time track in the system shown in FIGS. 1 and 2 is performed in the system of FIGS. 3 to 5 by tracks 116a, 116b which have performations 117a, 117b at positions spaced apart therealong corresponding to intervals of time between arrival of successive teeth or pins 142 at the topmost points of their travel. Thus, by meshing the teeth or pins 141 with these perforations, positive drive of the data carrier is established past the scanning head 121 at a speed corresponding to the elapse of time during the day. The spacing between successive perforations may, for example, represent intervals of 5 minutes, being also the time between arrival of successive pins at the topmost position.

In operation the user first sets the clock 146 to zero, i.e. 1200, and then inserts the leading end of the data carrier to mesh its perforations with the teeth or pins 142 of wheels 143 while still holding the shaft 144 stationary by means of knob 145.

The knob 145 is then rotated by the user driving the display 146a until it registers the same time as the display 128a of the "time of day" clock. If the display means is in the form of a 12 hour analogue (hands display) one complete pre-rotation of the hour hand of display 146 will be necessary if the data carrier is inserted after 12 noon.

The user releases knob 145 and clock motor of clock 146 then drives the data carrier past the row of sensors of the scanning head.

When a sensor such as 121A senses a mark such as 118A bistable circuit 150A is set to its second state, latch circuit 152A holds the "A" channel open and closes the "B" and "C" channels. The output, e.g. "1", at terminal 134A selects channel A at the receiver, and terminals 134D$_1$, 134D$_2$ become "live" to switch on the receiver.

When mark 119A passes the sensor 121A bistable circuit 150A is switched back to its first state, latch circuit 152A reverts to an inoperate state and all three channels A, B, C are free to become operative.

If, during the time interval 118A, 119A, another mark such as 118B has passed its sensor 121B, then bistable circuit 150B will have become switched to its second state and will, as soon as latch circuits 152A, 152B, 152C are freed, enable latch circuit 154B so that for the remainder of the time interval represented by 118B, 119B terminal 134B will have a "1" state and switch the receiver to channel B without the receiver being switched off, due to provision of the delay circuit 158a.

If, however, there is no time overlap between marks in the command channels or no immediate follow-on in another command channel, the receiver will be switched off by main switch circuit 158. The motor of clock 146 will continue to drive the data carrier 1 until it moves out of mesh with the wheels 148 and can be picked-up off plate 140b.

The data carrier in this system is preferably made of relatively stiff sheet material, e.g. thick card, or a plastics material if such composition and/or thickness is to provide reliable meshing and drive and it at least has command tracks presenting a surface capable of receiving a marking, e.g. by pencil, felt-tipped pen or other conveniently available writing instrument.

Referring now to FIG. 6 showing a form of control apparatus for which the data carrier of FIG. 1 is suitable, parts corresponding functionally to those already described are designated by like references with the prefix 200.

The differences between this control apparatus and that of FIG. 2 will best be understood by the following description which includes an explanation as to its manner of operation.

The units and circuits enclosed in the broken line boundary 226 provide for initial energisation of motor 230 upon insertion of the data carrier to advance the latter to a position such that the time scale 16 graduation mark 17 which corresponds to the (24 hour) time of day indication on display means 228A is brought into register with the row of photo-electric sensors 221E, 221D, 221A, 221B, 221C. The speed of motor operation is such that this is achieved in a short interval of time, typically 1 to 20 seconds. Thereafter the motor operates at the same speed, but stepwise, to provide for stepwise advancement of the data carrier in correspondence with the elapse of time so that, in respect of each interval between graduation marks 17 (representing typically 5 minutes), the data carrier occupies a position corresponding to the time of day at the beginning of this interval and is advanced one step on elapse of this interval.

For this purpose comparator means 263 compares the count registered in "time of day" counter 264 connected through conductor 235÷5 divider circuit 265 and conductor 256 to the "minute" pulse output from clock circuits of clock 228, with "data carrier position" counter 267. Operation is as follows. When the data carrier 1 is inserted sensor 221E senses the leading edge 8 or mark 6 and exciter or trigger circuit 223 resets counter 267.

The comparator provides one of two outputs, e.g. a high or "1" output, when the count registered in counter 267 is less than that in counter 264. This output sets motor control circuit 268 in a condition to enable motor drive circuit 269, which may be a thyristor drive circuit, via conductor 270 and energise motor 230.

When the two counts are equal the output of comparator means 263 changes, e.g. to "0", and the motor control circuit 268 is set in a condition to disenable the motor drive circuit 269.

During this interval, i.e. when the data carrier is being continuously advanced to the correct "time of day" position, the bistable circuits 250A, 250B, 250C are effectively isolated from their respective sensors 221A, 221B, 221C by the operation of bistable circuits 271A, 271B, 271C and gate circuits 272A, 272B, 272C.

These latter gate circuits may be AND gates requiring, say, a "1" signal on each of the two input conductors 275A, 275B, 275C and 276A, 276B, 276C.

The initial reset pulse provided by exciter circuit 223 on conductor 235 operates to set bistable circuits 271A, 271B, 271C in states such that conductors 275A, 275B, 275C are all "0" and so no enabling signal can pass to 250A, 250B, 250C to set these in their second states (output "1").

The conductor 274 is connected to a point in motor control circuit 268 such that it is at "0" during motor operation.

When motor control circuit changes state to disenable motor drive circuit conductor 274 becomes "1" thereby resetting bistable circuits 271A, 271B, 271C to their first states each to provide a "1" on respective conductors 275A, 275B, 275C.

Since no further signal can be applied to the inputs of bistable circuits 271A, 271B, 271C until the mark 5 or trailing end 7 of the data carrier moves beneath sensor 21E, bistable circuits 271A, 271B, 271C remain in this state for the remainder of travel of the data carrier.

Further data carrier travel occurs in steps, each step beginning as soon as the time of day counter registers a count of one in excess of "data carrier position" counter 267.

Should any of the sensors 221A, 221B, 221C be traversed by a start command mark 118A, 118B, 118C either during the movement step or on its termination, the appropriate bistable circuit 250A, 250B, 250C will be set in its second state producing, say, a "1" on the appropriate terminal 234A, 234B, 234C, and energising 234D$_1$, 234D$_2$ as already described for the apparatus shown in FIG. 4.

For simplicity, power leads from mains terminals to the motor drive circuit 269 and to the main switching circuit 258 are omitted from FIG. 6.

The motor 230 need not be a synchronous motor, in fact a D.C. motor may be used, the current in line 237 being pulsed, preferably smoothed, D.C.

Figure 7:
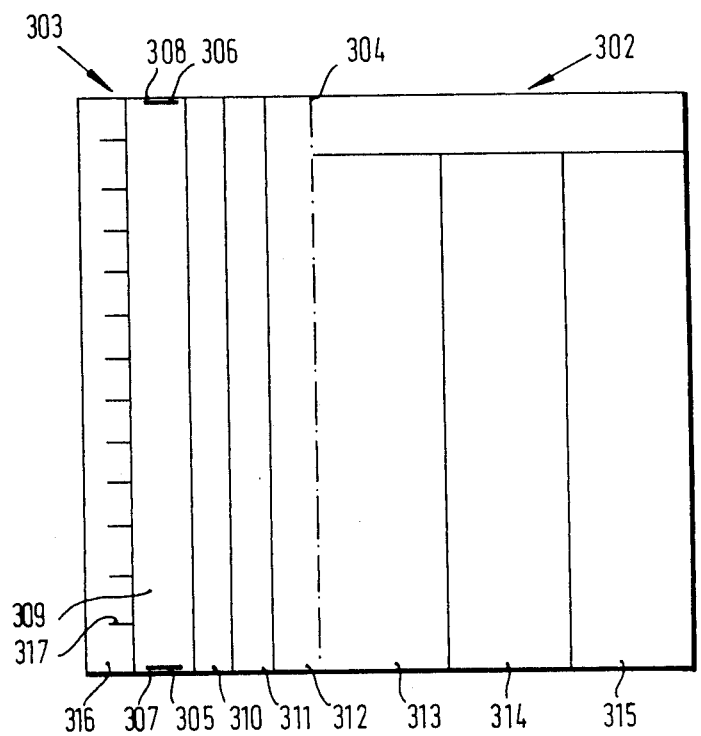
FIG. 7 shows a plan view of a further form of data carrier for use with the apparatus of FIG. 1 or FIG. 6.

FIG. 7 illustrates a data carrier in which parts corresponding to those of previously described embodiments are designated by like references with a prefix 300. In this form the time track 316 and command tracks 310, 311, 312 and start/stop track 309 on the one hand are detachably united to a portion 302 of the sheet on which the information tracks are printed as at 313, 314, 315. For this purpose the sheet is perforated along a line 304. Only the portion 303 to the left of the perforated part 304 need be loaded into the apparatus. Alternatively only the portion 303 may be provided, the time scale 317 being marked with the times of day to enable the user to mark the command tracks by reference to a separate printed programme showing what programme items are to be transmitted with details of times and channels.

It will, of course, be understood that various modifications may be made without departing from the scope of the invention. The following are specific but not exhaustive.

The time of day clock means and the data carrier may be adapted respectively by provision of suitable counting circuits and display to cover a period of longer than one day, e.g. one week or even more. The expression "time of day" is used generically to denote an instant of time within one 24 hour or whatever longer period may be selected as suitable for the purposes of the invention and includes night time periods.

Scanning can be effected utilising a stationary data carrier support means and a movable scanning head driven by the motor means already described.

Alternatively strip arrays of sensors such as phototransistors may be stationarily imaged relative to respective areas along each command track and/or time track and may be scanned electronically to sample their outputs sequentially.

Any of the circuits or units shown in FIGS. 2, 4 or 6 may be built up of separate components or may be in the form of integrated circuit units.

The motor means may be rotary or reciprocatory, in the latter case comprising pawl or finger means to advance the data carrier.

Further, the control apparatus may be made as a separate unit or combined with a recording apparatus for television or radio receivers to form a unit therewith.

I claim:

1. A method of controlling the operation of a recorder of electrical video and/or audio signals produced in a television and/or radio recorder, said method comprising:
   a. providing a data carrier having
      i. at least one information track marked with data identifying a sequence of programmes to be transmitted over a channel pertaining to that track,
      ii. at least one command track associated with the information track for receiving a users marking appropriately positioned to select one or more of the programmes or part thereof,
      iii. at least one time track having a sequence of index means along the time track representing the elapse of time,
   b. marking said command track or tracks as required,
   c. providing a control apparatus having means for sensing the marking or markings to generate control signals for establishing operation of the television and/or radio receiver and associated recorder,
   d. applying the data carrier to the control apparatus and registering a point on the command track corresponding to the time of day then existing with the sensing means by effecting advancement of the data carrier relative to the apparatus under the control of the index means of the time track,
   e. and thereafter relatively advancing the data carrier further to effect scanning of the command track with said sensing means and in a direction corresponding to the sequence of programme data and in synchronism with the elapse of time to generate said control signals.

2. A method according to claim 1 wherein:
   a. the data carrier has a plurality of said information tracks,
   b. the data carrier has a plurality of command tracks each associated with a respective one of the information tracks, and
   c. channel selection is effected by marking the command track selectively.

3. A method according to claim 1 wherein:
   a. said time index means comprises graduation marks collectively defining a time scale,
   b. said marks are sensed by scanning means and counted to provide a first count,
   c. a count representing the time of day is generated to provide a second count,
   d. the first and second counts are compared and a signal generated in response to the difference to control advancement of the data carrier to register said point on the command track with the sensing means and thereafter control further advancement to bring about scanning of the mark or marks of the command track of the data carrier.

4. A method according to claim 1 wherein:
   a. said time index means comprises a series of successive voids and intervening abutments on said data carrier,
   b. advancement of the data carrier is effected by meshing a driving member with said time index means and initially applying drive motion to said driving member while indicating the time of day then existing and the time of day corresponding to successive points along the command tracks until there is coincidence,
   c. and thereafter applying drive to said driving member in conformity with the elapse of time to maintain said coincidence.

5. A method of controlling the operation of a recorder of electrical video and/or audio signals produced in a television and/or radio receiver, said method comprising:
   a. providing a data carrier having
      i. at least one time track having a sequence of index means along the track and representing the elapse of time,
      ii. at least one command track associated with said time track and for receiving a users marking appropriately positioned to select one or more of a sequence of programmes received by said receiver,
   b. marking said command track or tracks as required with stepless determination as to the position along said command track of said marking,
   c. providing a control apparatus having sensing means for sensing the marking or markings to generate control signals for establishing operation of the television and/or radio receiver and associated recorder
   d. applying the data carrier to the control apparatus and registering a point on the command track corresponding to the time of day then existing with the sensing means by effecting advancement of the data carrier relative to the apparatus under the control of the index means of the time track, e. and thereafter relatively advancing the data carrier further to effect scanning of the command track with said sensing means and in a direction corresponding to the sequence of programme data and in synchronism with the elapse of time to generate said control signals.

6. A method according to claim 5 wherein:
a. said data carrier has means defining one or more information tracks contained on a portion or respective portions of the carrier detachably united with the remainder of said carrier,
b. said information track or tracks are marked with data identifying a sequence of programmes to be transmitted for a channel pertaining to the or each of said tracks and positionally correlated with said time track in accordance with transmission times of said programmes,
c. said detachable portion or portions are detached preparatory to application of the data carrier to the control apparatus for said scanning.

7. The combination of a data carrier and control apparatus comprising respectively a sheet having:
a. means defining at least one information track marked with data identifying a sequence of television and/or radio programmes to be transmitted over a channel pertaining to that track,
b. means defining at least one command track associated with the information track for receiving a users marking of appropriate steplessly variable position to select one or more of the programmes or part thereof,
c. means defining a time track having a sequence of index means along said time track representing the elapse of time, and a control apparatus for controlling the time of operation of a recorder of electrical video and/or audio signals produced in an associated television and/or radio receiver and having:
d. means for sensing the marking to generate control signals for establishing operation of the television and/or radio receiver and associated recorder,
e. means providing data representing the existing time of day,
f. transporter means for effecting relative advancement of the data carrier past the sensing means and including first means cooperating with the time track to effect relatively quick advancement of the data carrier to a position such that a point on the command track corresponding to the existing time of day is sensed by the sensing means, and second means cooperating with the time track to effect thereafter relatively slow advancement in which the point undergoing scan by the sensing means continues to correspond with the time of day as such time elapses.

8. The combination of claim 7 wherein:
a. a plurality of said information tracks are provided on the data carrier,
b. a plurality of said command tracks are provided on the data carrier each associated with a respective one of said information tracks,
c. the sensing means of the control apparatus includes a plurality of sensors for sensing respective command tracks,
d. a switching circuit is provided in the control apparatus responsive to the outputs of respective ones of the sensors to establish a respective channel of the receiver in operation.

9. The combination of claim 8 wherein each command track extends parallel to and lies adjacent to its associated information track.

10. A data carrier according to claim 8 or claim 9 wherein a single time track is provided having a sequence of index means along said time track representing the elapse of time.

11. Control apparatus for controlling the time of operation of a recorder of electrical video and/or audio signals produced in an associated television and/or radio receiver, said control apparatus comprising:
a. scanning means for receiving a data carrier having a time track including a sequence of index means along said time track representing elapse of time, and having at least one command track for bearing a user marking representing the transmission time of any of, or any part of, a sequence of television and/or radio programmes, said scanning means including sensing means being responsive to a user marking made in such track to generate a control signal,
b. means providing data representing the existing time of day,
c. transporter means including first means cooperating with the time track to effect relatively quick advancement of the data carrier to a position such that a point on the command track corresponding to the existing time of day is sensed by the sensing means and second means cooperating with the time track to effect thereafter relatively slow advancement in which the point undergoing scan by the sensing means continues to correspond with the time of day as such time elapses,
d. switch circuit means operatively connected with the sensing means and responsive to the control signal to establish a circuit for bringing the recorder and associated television and/or radio receiver into operation.

12. Control apparatus according to claim 11 wherein:
a. said scanning means comprises
  i. sensing means including respective sensors for sensing said user marking in said command track and time index means in said time track,
  ii. support means for said data carrier,
  iii. motor means for effecting relative movement longitudinally of said tracks between said support means and said sensing means to generate a series of time track signals from the beginning of said time track, and
b. said transporter means includes
  i. a first counting means for counting elapse of time during the day,
  ii. a second counting means for counting said time track signals,
  iii. comparator means connected to compare output from said first and second counting means and connected to said motor means to start said motor means when said first counting means provides an output showing greater time elapse than is represented by the output of said second counting means; and to stop said motor when said outputs represent the same elapse of time.

13. Control apparatus according to claim 11 wherein:
a. said scanning means comprises sensing means including respective sensors for sensing user markings in respective ones of a plurality of said command tracks, and
b. said switch circuit means includes i. a plurality of switching channels responsive to the outputs of respective ones of said sensors to establish a respective channel of an associated receiver in operation, ii. latch means for holding that one of said channels which first responds for the period represented by said user marking in the associated command track for the period of said marking.

14. Control apparatus according to claim 11 wherein:
a. said means providing data comprises clock means for providing an output representing the time of day, and
b. said first means comprises synchronising means for establishing said data carrier and said sensing means in relative positions in accordance with said output of said clock means.

15. Control apparatus according to claim 14 wherein:
a. said clock means includes means for displaying the time of day, and
b. said synchronising means comprises means for manually adjusting the position of said data carrier relatively to said scanning means at the beginning of a period of use.

16. Control apparatus according to claim 14 wherein:
a. said clock means includes a synchronous electric motor,
b. said scanning means comprises
  i. sensing means for sensing said user marking,
  ii. support means for said data carrier,
  iii. transport means for effecting relative movement longitudinally of said command track between said support means and said sensing means,
c. said motor is operatively connected with said transport means.

17. A data carrier comprising a sheet having:
a. means defining at least one information track marked with data identifying a sequence of television and/or radio programmes to be transmitted over a channel pertaining to that track,
b. means defining at least one command track associated with the information track for receiving a users marking appropriately positioned to select one or more of the programmes or part thereof,
c. advancement speed control means to enable the command track to be scanned by means for sensing the marking or markings in a direction corresponding to the sequence of programme data and in synchronism with the elapse of time over the interval when the sequence of programmes is transmitted,
d. index means at one or both ends of said carrier for sensing by sensing means to initiate and/or stop advancement.

* * * * *